(12) United States Patent
Zou et al.

(10) Patent No.: US 7,916,400 B2
(45) Date of Patent: Mar. 29, 2011

(54) COMPACT ZOOM LENS

(75) Inventors: Long-Liang Zou, Guangdong (CN); Zi-Yuan Li, Guangdong (CN); Bin Lei, Guangdong (CN); Xiao-Tian Kang, Guangdong (CN); Jian-Jun Zhang, Guangdong (CN)

(73) Assignees: Premier Image Technology (China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 18 days.

(21) Appl. No.: 12/430,062

(22) Filed: Apr. 24, 2009

(65) Prior Publication Data
US 2010/0165481 A1 Jul. 1, 2010

(30) Foreign Application Priority Data
Dec. 27, 2008 (CN) .......................... 2008 1 0306602

(51) Int. Cl.
*G02B 15/14* (2006.01)
(52) U.S. Cl. ....................... 359/700; 359/694
(58) Field of Classification Search .................. 359/700
See application file for complete search history.

(56) References Cited

U.S. PATENT DOCUMENTS

| 7,525,581 B2 * | 4/2009 | Suh .............................. 348/240.3 |
| 2003/0081325 A1 * | 5/2003 | Nomura et al. ................ 359/700 |
| 2005/0286142 A1 * | 12/2005 | Inamoto ........................ 359/700 |

FOREIGN PATENT DOCUMENTS
JP 200820488 A 1/2008

* cited by examiner

*Primary Examiner* — Ricky L Mack
*Assistant Examiner* — James C Jones
(74) *Attorney, Agent, or Firm* — Zhigang Ma

(57) ABSTRACT

A zoom lens includes a substrate, an imaging unit, a stationary lens barrel, a cam lens barrel and a guide lens barrel. The substrate defines a plurality of openings thereon. The imaging unit is attached on the substrate. The stationary lens barrel is mounted on the substrate and surrounding the imaging unit. The cam lens barrel is rotatably received in the stationary lens barrel and movable along the optical axis of the zoom lens as the rotation thereof along the inner circumference of the stationary lens barrel. The guide lens barrel is received in the cam lens barrel and movable axially following the motion of the cam lens barrel, and comprises a plurality of key numbers protruding outwards from the outer circumference corresponding to and received in the openings of the substrate when the zoom lens is positioned in the minimum focal length position.

17 Claims, 7 Drawing Sheets

COMPACT ZOOM LENS

BACKGROUND

1. Technical Field

The disclosure relates to a zoom lens and, more particularly, to a zoom lens having simple and compact structure.

2. Description of the Related Art

Image capture devices (hereinafter cameras) are miniaturized for ease of transport. Among such cameras, zoom lenses occupies a large portion of a camera in terms of volume, size, and weight. Generally, the zoom lens is composed of a number of lens barrels as part of a photographic optical system. The lens barrels move along the optical axis of the photographic optical system for zooming in and out. However, the structure of the lens barrels is complex and bulky, compromising compactness trends.

Therefore, it is desirable to provide a zoom lens can overcome or at least alleviate the above described problem.

DETAILED DESCRIPTION

Figure 1:
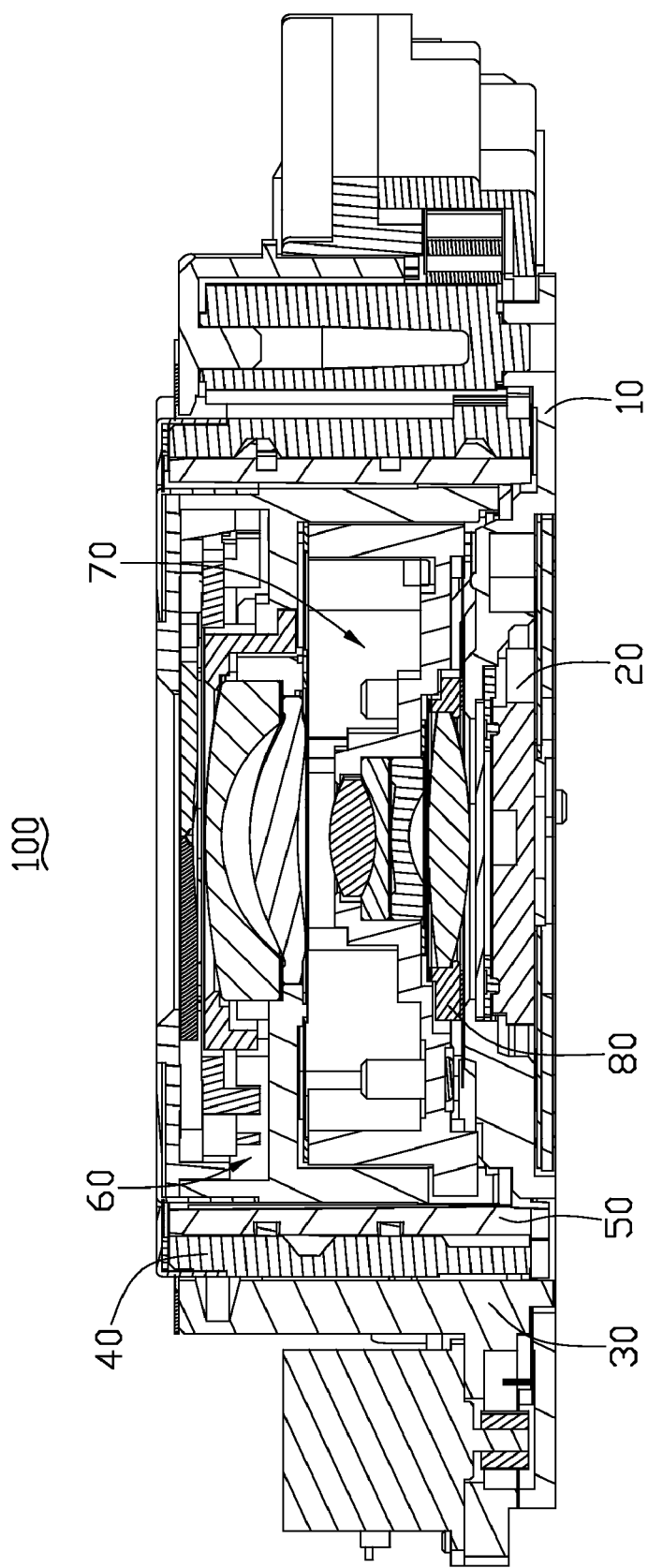
FIG. 1 is a schematic cross section view of a zoom lens in a minimum focal length position, according to an exemplary embodiment.

Referring to FIG. 1, a zoom lens 100 according to an exemplary embodiment, includes a substrate 10, an imaging unit 20, a stationary lens barrel 30, a cam lens barrel 40, a guide lens barrel 50 and first to third lens groups 60, 70 and 80. The imaging unit 20 is mounted on the substrate 10. The stationary lens barrel 30 is set on the substrate 10 and receives the imaging unit 20 in the distal open end thereof. The cam barrel 40 is slidably and rotatably received in the stationary lens barrel 30 and movable along the optical axis of the zoom lens 100 following the rotation thereof along the inner circumference of the stationary lens barrel 30. The guide lens barrel 50 is received in the cam lens barrel 40 and movable along the optical axis of the zoom lens 100 following the motion of the cam lens barrel 40. The first and second lens groups 60, 70 are slidably received in the guide lens barrel 50 in sequence, and slidably contact the cam lens barrel 40 thereby, such that the first and second lens groups 60, 70 can move along the optical axis of the zoom lens 100 following the rotation of the cam lens barrel 40. The third lens group 80 is supported above the substrate 10, aligned with the imaging unit 20, and the first and second lens groups 60, 70.

Figure 2:
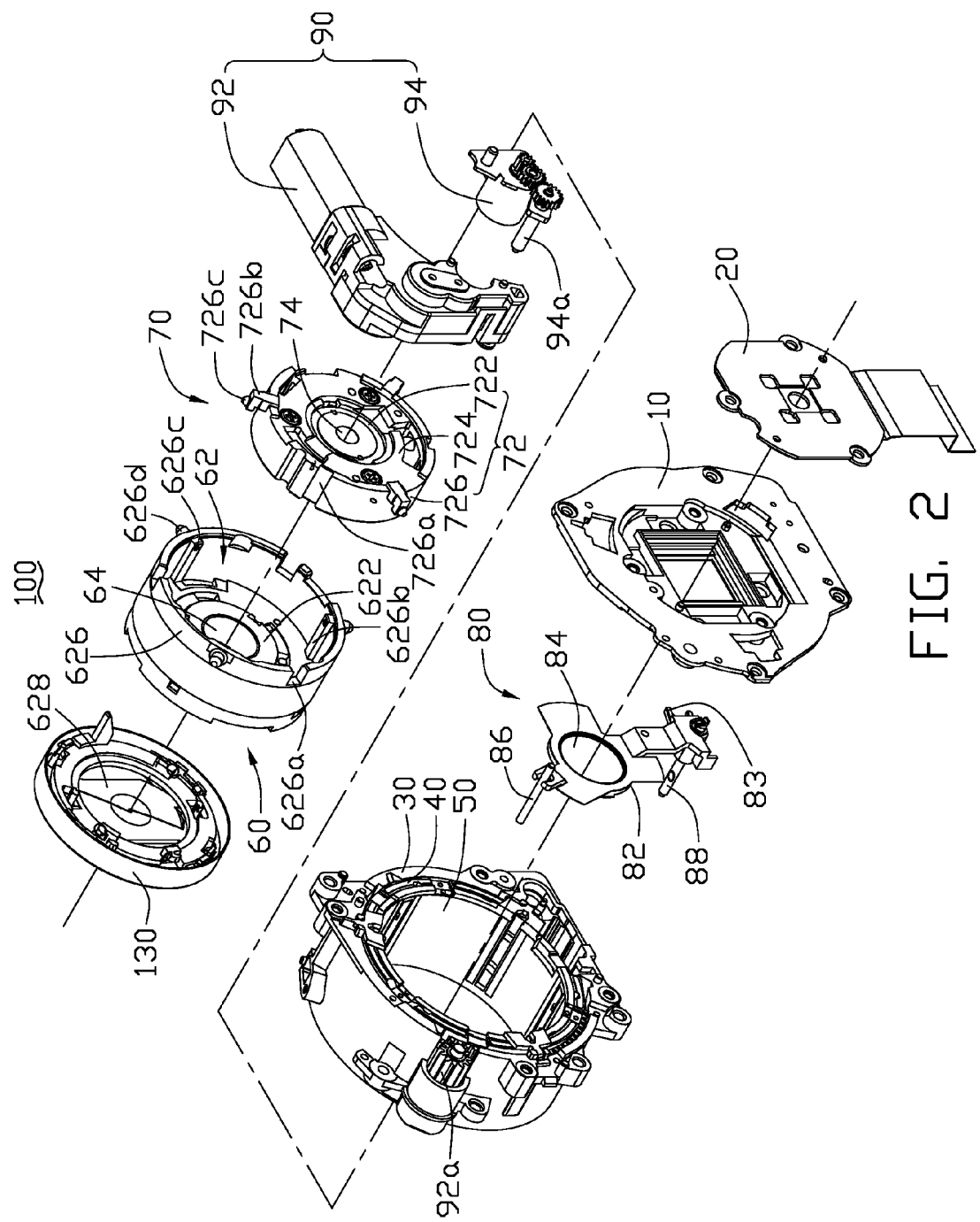
FIG. 2 is an isometric, exploded view of the zoom lens of FIG. 1.
Figure 3:
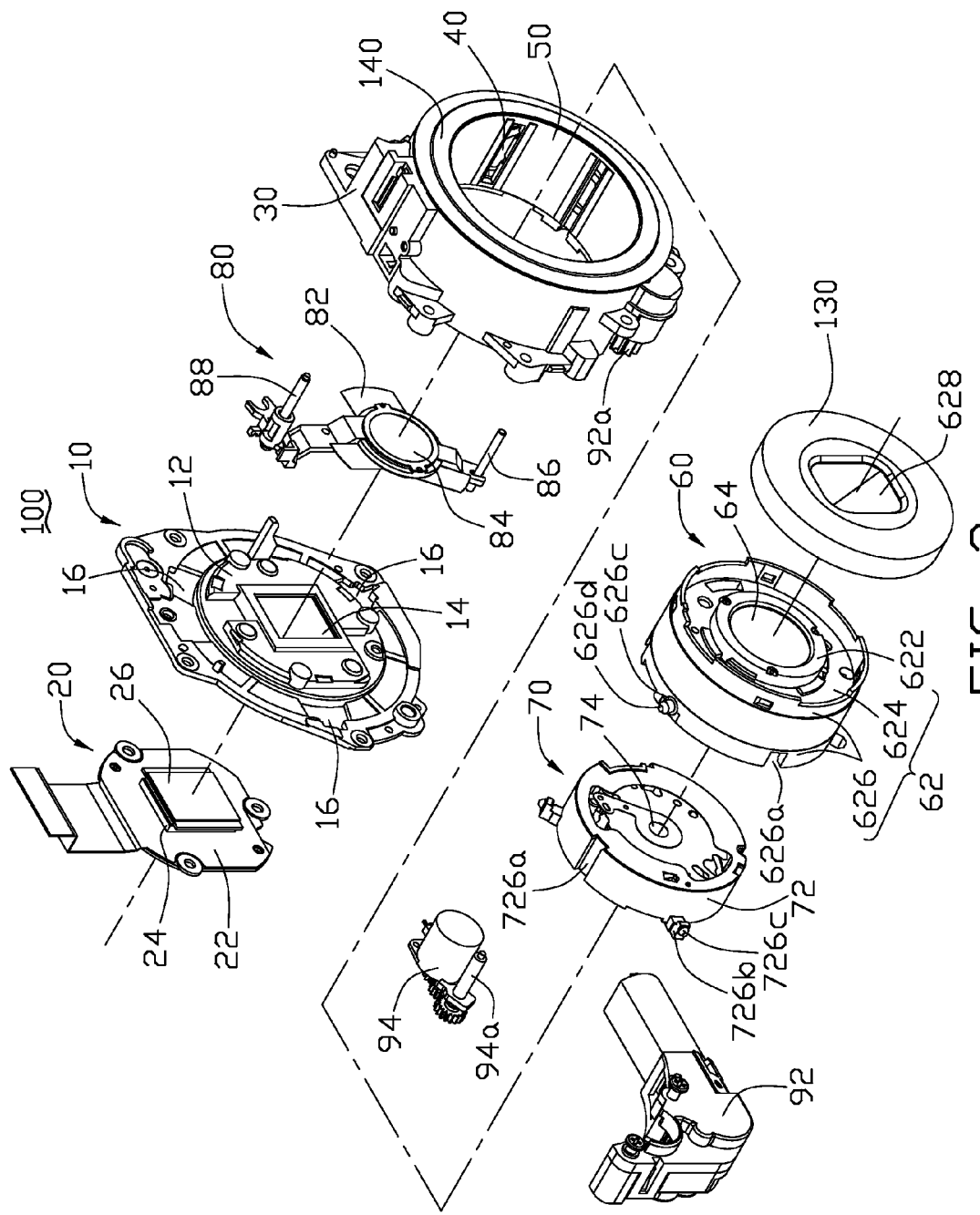
FIG. 3 is similar to FIG. 2, but shows the zoom lens from another perspective.

Referring to FIGS. 2 and 3, the substrate 10 is configured for supporting the component members of the zoom lens 100 installed in a camera body (not shown). The substrate 10 defines a cylindrical portion 12 with a window 14 defined on a face thereof. The cylindrical portion 12 protrudes upwards from a surface of the substrate 10 and is configured for receiving the imaging unit 20 and exposing the sensitive area of the imaging unit 20 via the window 14 thereof to sense the incident light from the lens groups 60 to 80 of the zoom lens 100. Three openings 16 are defined on the substrate 10 around the cylindrical portion 12 at substantially 120° equiangularly. It is to be noted that the number of openings 16 in the substrate 10 is not limited to that of the description, and can vary with need and configuration while remaining well within the scope of the disclosure.

The imaging unit 20 received in the cylindrical portion 12 of the substrate 10, includes a baseboard 22, a sensor chip 24 electrically and mechanically connected to the baseboard 22, and a transparent plate 26 attached on the sensitive surface of the sensor chip 24. The baseboard 22 is mounted on the substrate 10 and electrically connects the sensor chip 24 to other peripheral circuits and elements. The sensor chip 24 is an imaging device configured for detecting incident light, converting it into corresponding electronic signals, and outputting the signals from the baseboard 22. The transparent plate 26 is configured for protecting the sensor chip and filtering infrared rays accompanying the incident light.

Figure 4:
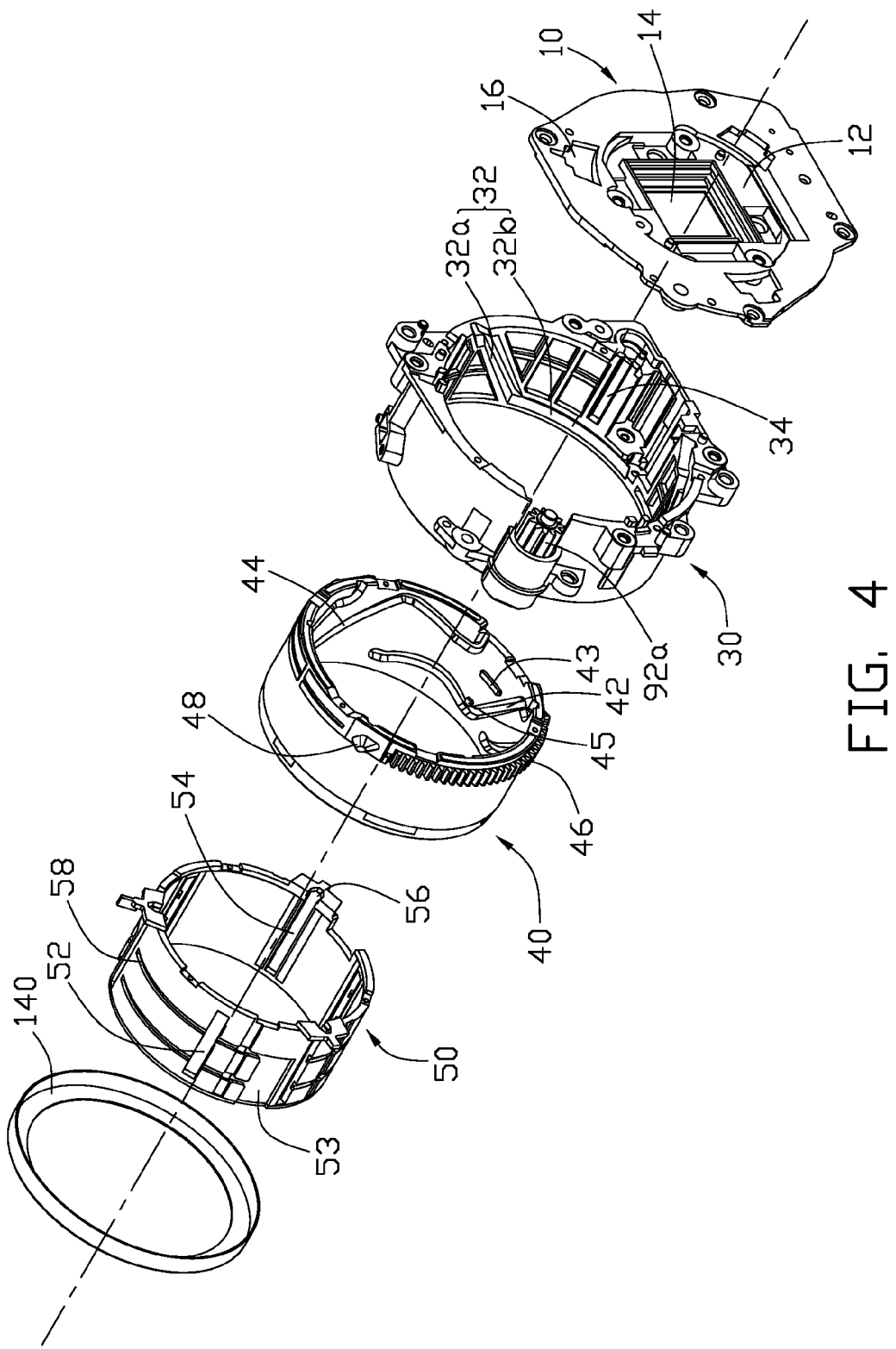
FIG. 4 is an isometric, exploded view of partial component members of the zoom lens as shown in FIG. 1.
Figure 5:
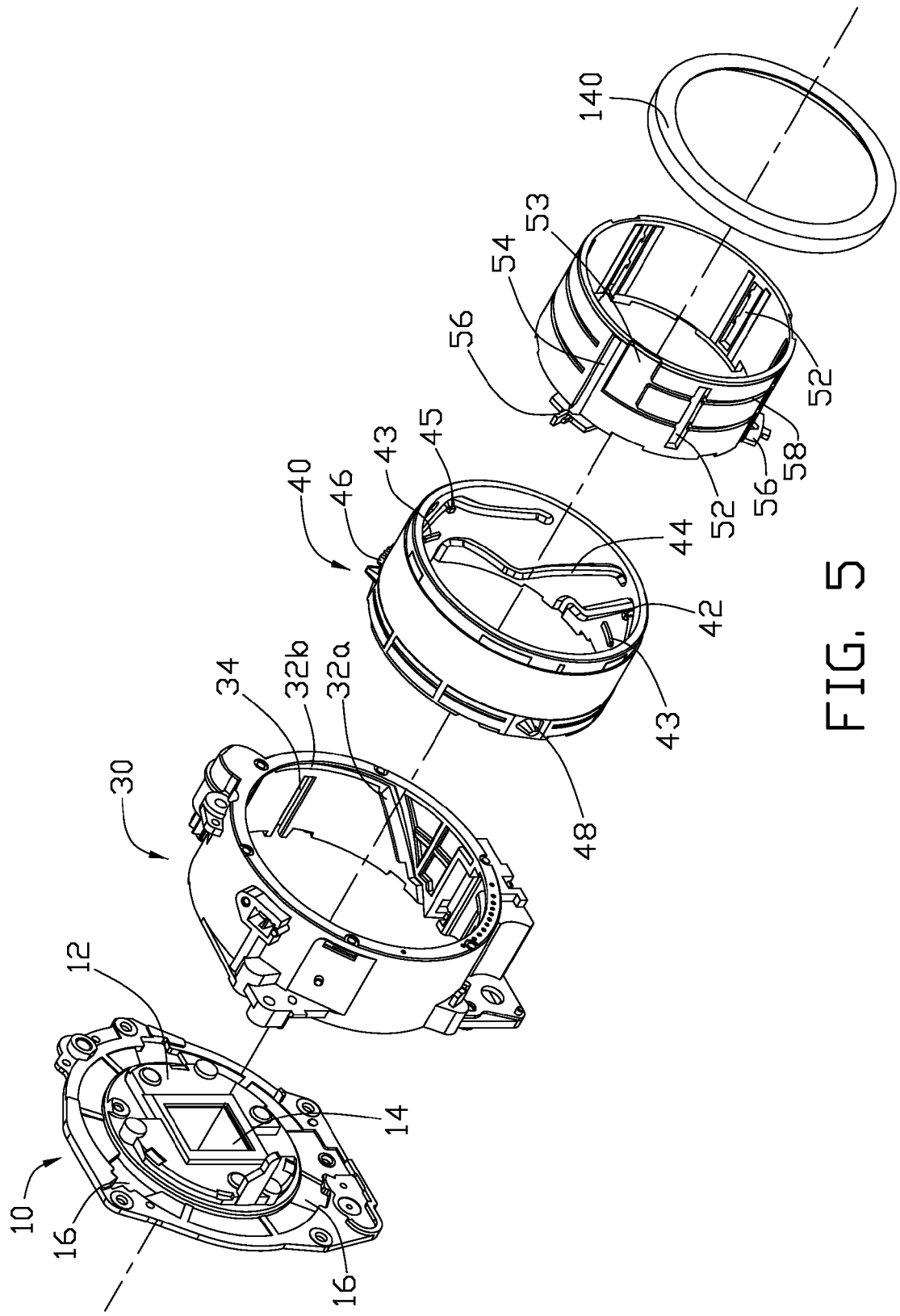
FIG. 5 is similar to FIG. 4, but shows the partial component members of the zoom lens from another perspective.

Referring to FIGS. 4 and 5, the stationary lens barrel 30 is mounted on the substrate 10. The stationary lens barrel 30 defines a number of first sliding grooves 32 angled from the optical axis of the zoom lens 100 and a number of second sliding grooves 34 parallel to the optical axis of the zoom lens 100 in the inner circumference thereof. The first sliding grooves 32 and the second sliding grooves 34 are alternatively provided in the inner circumference of the stationary lens barrel 30 and separated evenly. Here, the stationary lens barrel 30 includes three first slide grooves 32, each of which includes a spiral portion 32a properly angled from the optical axis of the zoom lens 100, and an arched portion 32b perpendicular to the optical axis of the zoom lens 100 and communicating with an end of the spiral portion 32a. Each spiral portion 32a coils in a constantly changing path along the inner circumference of the stationary lens barrel 30, from rear to front of the stationary lens barrel 30. The arched portion 32b is defined in the front of the inner circumference of the stationary lens barrel 30.

The cam lens barrel 40 is movably received in the stationary lens barrel 30 and defines a number of first cam grooves 42 and a number of second cam grooves 44 thereon, evenly spaced in the circumferential direction of the cam lens barrel 40 and formed by cutaways on the inner side of the cam lens barrel 40. The first cam grooves 42 and the second cam grooves 44 are alternatively provided on the inner circumference of the cam lens barrel 40 in the circumferential direction of the cam lens barrel and extend from the rear end adjacent to the substrate 10 to the front end away from the substrate 10. The cam lens barrel 40 includes a number of three cam pins 48 projecting outwards at evenly separated intervals, preferably at substantially 120° dispersals on the outer circumference of the lens barrel near the rear end thereof. The cam pins 48 engage the first guide grooves 32 of the stationary lens barrel 30 and can slide along the first guide grooves 32 when the cam lens barrel 40 is rotated relative to the stationary lens barrel 30. The cam lens barrel 40 further includes a toothed bar 46 formed on the outer circumference thereof between two cam pins 48 for meshing with a driving gear. The toothed bar 46 and the cam pins 48 of the cam lens barrel 40 are formed on the same latitudinal circumference of the cam lens barrel 40. The configuration of the cam lens barrel 40 contributes greatly in reducing a height of the cam lens barrel 40 and the overall height of the zoom lens 100 because the toothed bar 46 and the cam pins 48 are formed on the same latitudinal circumference of the cam lens barrel 40, occupying minimal area on the cam lens barrel 40 and effectively conserving length thereof. In the inner circumference of the cam lens 40, a number of sliding bars 43 are projected inwards and evenly positioned in the circumferential direction thereof, configured for slidably engaging the guide lens barrel 50. To enhance the mechanical strength of the cam groove walls of the cam grooves 42, 44, one or more reinforcing blocks 45 can be formed on the inner circumference adjacent to the corners of the first and second cam grooves 42 of the cam lens barrel 40.

The guide lens barrel 50 is received in the cam lens barrel 40. The guide lens barrel 50 defines a number of first sliding slots 52 and second sliding slots 54 extended axially on and running through the inner circumference thereof alternately. Each second sliding slot 54 has an open end at the rear distal of the guide lens barrel 50 adjacent to the substrate 10. The guide lens barrel 50 further includes a number of key members 56 projecting outward at even intervals on the outer circumference thereof corresponding to the open ends of the second sliding slots 54. The key members 56 extend beyond the rear distal portion of the cam barrel lens 40 to align with the second sliding groove 34 of the stationary lens barrel 30. Here, the guide lens barrel 50 includes three key members 56 respectively received in the opening 16 of the substrate 10 when the zoom lens 100 is in the minimum focal length position thereby to reduce the height of the zoom lens 100. When the cam lens barrel 40 is driven along the first sliding grooves 32, the key members 56 of the guide lens barrel 50 fit in the second sliding groove 34 of the stationary lens barrel 30 and move therealong. Corresponding to the sliding bars 43 and the reinforcing blocks 45 of the cam lens barrel 40, the guide lens barrel 50 defines a corresponding number of notches 52 on the outer circumference thereof allowing the sliding bars 43 and the reinforcing blocks 45 to slide therein. Adjacent to the ends of the notches 52, the guide lens barrel 50 defines a number of passing channels 53 on the outer circumference thereof communicated with notches 52 and axially extending to a front distal end of the guide lens barrel 50 away from the substrate 10 allowing the blocks 45 and sliding bars 43 of cam lens barrel 40 to fit into the notches 52 therethrough.

Referring to FIGS. 1, 2 and 3, the first lens group 60 is received in the guide lens barrel 50. The first lens group 60 includes a first lens frame 62 and at least one part of first lens 64 supported by the first lens frame 62. The first lens frame 62 includes a first center portion 622 with a through hole defined thereon receiving the first lens 64, a first ringed portion 624 connecting and encircling the first center portion 622, and a first support wall 626 formed around the periphery of the and extending from the periphery of the first ringed portion 624 along two opposite directions. A shutter mechanism 628 can be positioned on the first ringed portion 624 of the first lens frame 62 for switching the optical path of the lens zoom 100 on or off. The first support wall 626 defines a number of cutouts 626a at even intervals in a circumferential direction on the rear distal end thereof. The first support wall 626 has a number of ribs 626b protruding inwards from the inner circumference between the adjacent cutouts 626a, and defines a number of thread holes 626c at the rear distal portion thereof corresponding to the ribs 626b and running through the corresponding ribs 626b. A corresponding number of sliding pins 626d are respectively engaged in the thread holes 626c by one end thereof, with the other ends engaged in the first cam grooves 42 of the cam lens barrel 40 by passing through the first sliding slots 52 of the guide lens barrel 50. When the cam lens barrel 40 rotates around the guide lens barrel 50 along the arched potions 32b of the sliding grooves 32, the first sliding pins 626d slide in the first cam grooves 42 of the cam lens barrel 40 along the first sliding slot 52 of the guide lens barrel 50. Thereby, the first lens group 60 can move axially along the guide lens barrel 50 following the motion of the first sliding pins 626d.

The second lens group 70 is positioned in the guide lens barrel 50 and partly received in the rear portion of the first lens frame 62 of the first lens group 60. The second lens group 70 includes a second lens frame 72 and at least one piece of second lens 74 positioned in the second lens frame 72. The second lens frame 72 includes a second center portion 722 with a through hole defined thereon for receiving the second lens 74, a second ringed portion 724 connecting and encircling the second center portion 722, and a second support wall 726 encircling the second ringed portion 724 and extending forwards from the periphery of the second ringed portion 724. The second support wall 726 defines a number of indentions 726a on the outer circumference corresponding to the ribs 626b of the first lens frame 62 and fitting in the corresponding ribs 626b. A number of protrusions 726b project outwards from an outer circumference of the second support wall 726 at the rear distal away from the first lens group 60. The protrusions 726b are fitted in the cutouts 626a of the first lens frame 62. A number of second sliding pins 726c are formed on the tips of the protrusions 726b of the second lens frame 72 and extend beyond the first support wall 62 of the first lens group 60 to pass through the second sliding slots 54 of the guide lens barrel 50 and fit in the second cam grooves 44 of the cam lens barrel 40. The second lens group 70 can be driven axially similar to the first lens group 60 by the cam lens barrel 40 along the guide lens barrel 50. Understandably, a diaphragm mechanism 76 can be positioned on the front side of the second ringed portion 724 of the second frame 72 of the second lens group 70 to control the amount of light traversing the optical system of the zoom lens 100.

The third lens group 80 is mounted on the substrate 10 facing the imaging unit 20 and aligning with the optical axis of the first and second lenses 64, 74 of the first and second lens groups 60, 70. The third lens group 80 includes a third lens frame 82, at least one piece of third lens 84 supported on the third lens frame 84, at least one guide rod 86, and an actuating rod 88, and an engagement piece 83. The at least one guide rod 86 and the actuating rod 88 are mounted in separated positions on the substrate 10 adjacent to the window 14 of the cylindrical portion 12. The third lens frame 82 is slidably supported on the guide rod 86 and the actuating rod 88. The engagement piece 83 is mounted on an edge of the third lens frame 82 and engaged with a threaded driving rod of a driving device by a U-shaped threaded block (not labeled) thereof. The lens 84 and the lens frame 82 can be axially moved by the driving device along the guide rod 86 and the actuating rod 88.

The zoom lens 100 further includes a driving mechanism 90, a lens cover 130, and a sealing ring 140 (shown in FIG. 4). The driving mechanism 90 is configured for driving the zoom lens 100 to carry out focusing operation, and includes a first driving device 92 and a second driving device 94 which are mounted at about 90° to 180° separated positions on the outer circumference of the stationary lens barrel 30 for compacting the zoom lens 100. The first driving device 92 includes a driving gear 92a rotatably set in the stationary lens barrel 30 and meshed with the toothed bar 46 to rotate cam lens barrel 40. The second driving device 94 includes a driving rod 94a meshed with the engagement piece 83 for driving the third lens group 80 along the driving rod 94a. The lens cover 130 is mounted on the front end of the first lens frame 62 of the first lens group 60 for protecting the lens 64 from damage and contamination. The sealing ring 140 is mounted on the front end of the stationary lens barrel 30 and seals gaps among the stationary lens barrel 30, the cam lens barrel 40 and the guide lens barrel 50 to prevent contamination.

Figure 6:
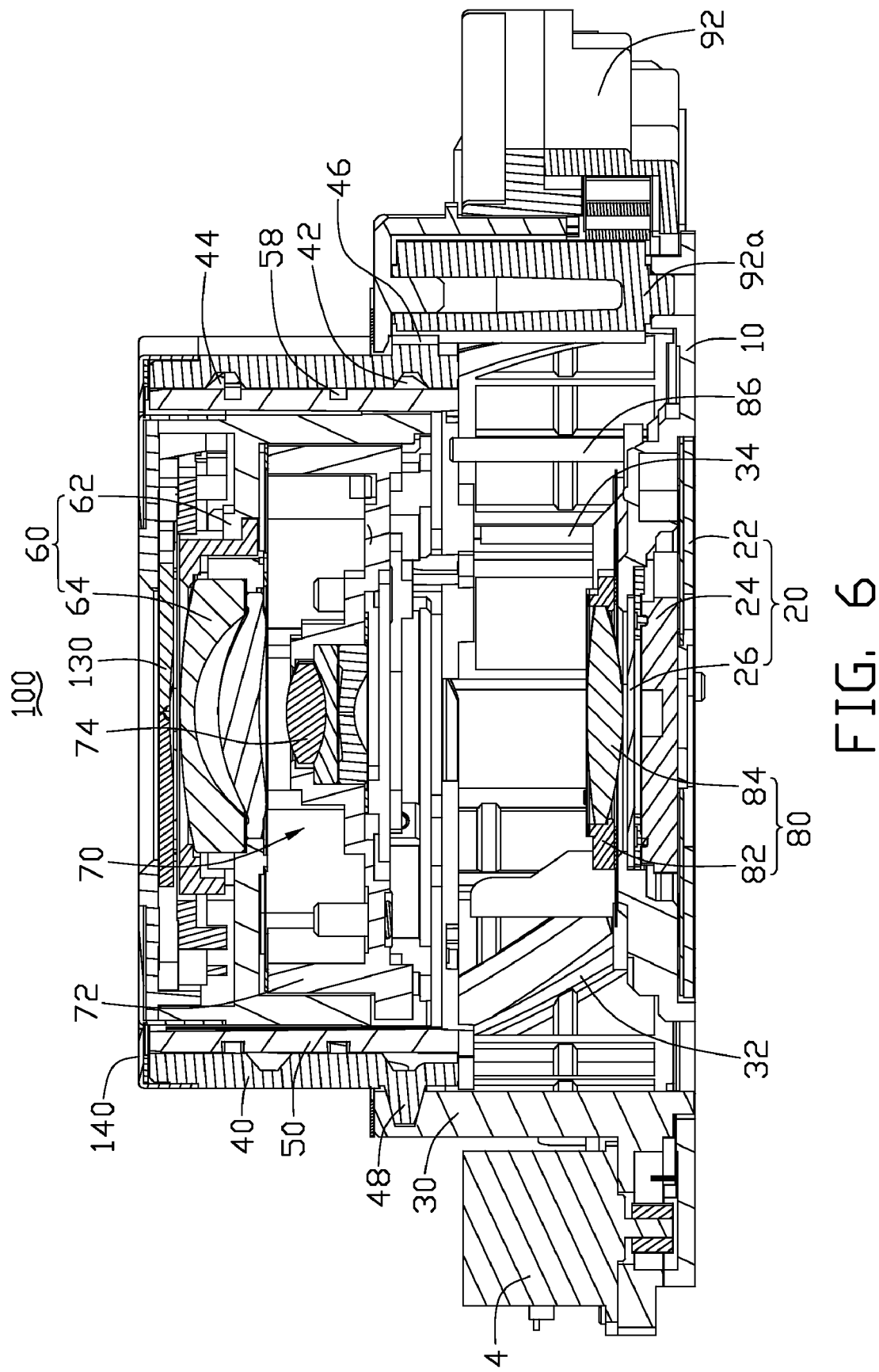
FIG. 6 is a schematic cross section view of the zoom lens in a partly extended position in the minimum focal length position shown in FIG. 1.
Figure 7:
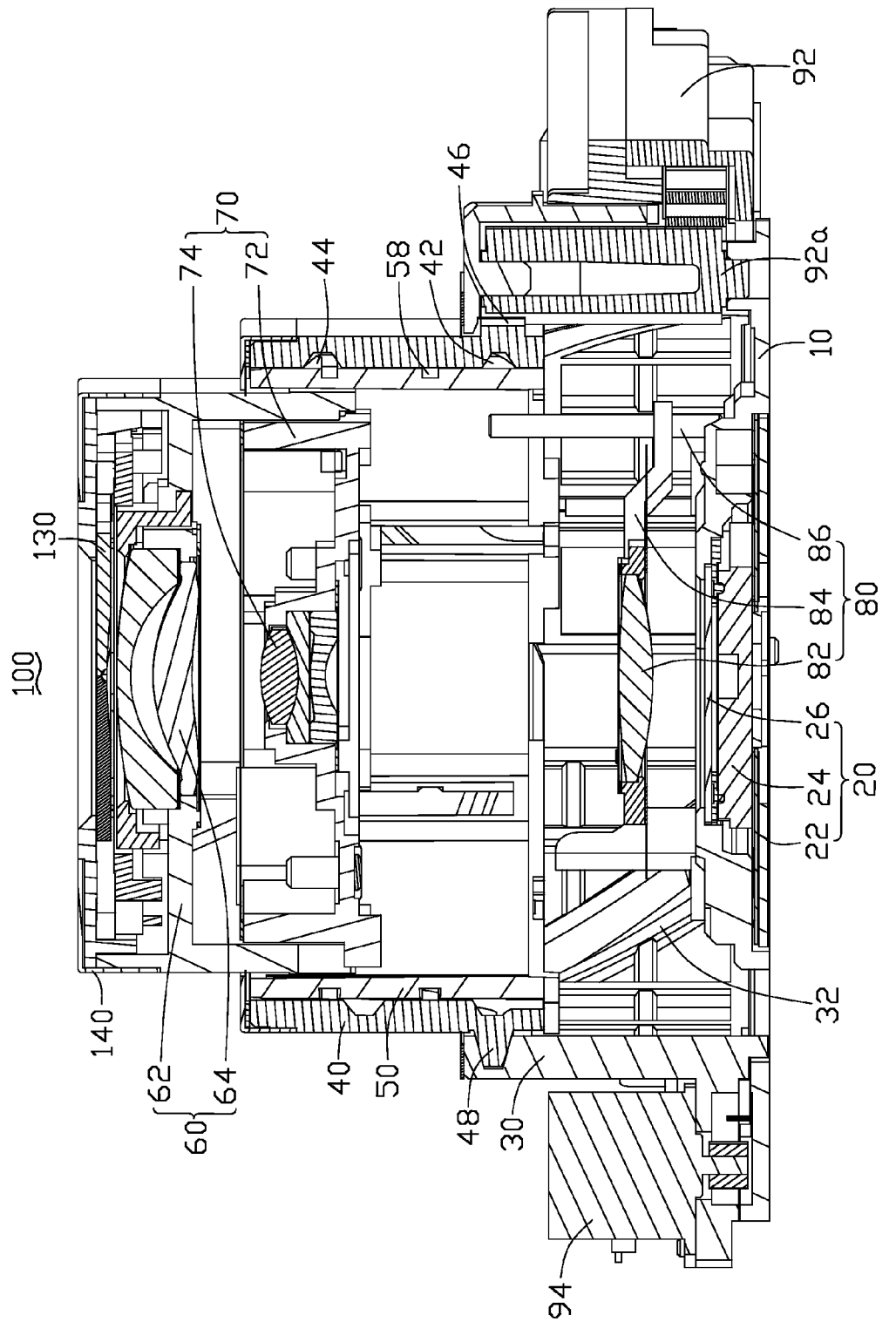
FIG. 7 is a schematic cross section of the zoom lens of FIG. 1 in the maximum focal length position.

Referring to FIGS. 4, 5 and 6, in use, the cam lens barrel 40 is rotated by the driving gear 92a of the first driving device 92 around the inner circumference of the stationary lens barrel 30, and extends axially with respect to the stationary lens barrel as the cam pins 48 thereof slide in the spiral potions 32a of the first sliding grooves 32 of the stationary lens barrel 30. Following extension of the cam lens barrel 40, the guide lens barrel 50 is extended axially with respect to the stationary lens barrel 30 by the sliding bar 43 in the notches 58 thereof, and the key members 56 of the guide lens barrel 50 fit and are limited in the axial second sliding grooves 34 of the stationary lens barrel 30. Thus, the guide lens barrel 50 can only be extended axially, but not rotated with respect to the stationary lens barrel 30.

Referring to FIGS. 2 to 5 and 7, the first and second lens groups 60, 70 received in the guide lens barrel 50 extend axially with respect to the stationary lens barrel 30 with extension of the cam lens barrel 40 and guide lens barrel 50. When the cam pins 48 slide into the arched portion 32b of the first sliding grooves 32, the cam lens barrel 40 stops extending axially and rotates around the inner circumference of the stationary lens barrel 30. Following rotation of the cam lens barrel 40, the first sliding pins 626d and the second sliding pins 726c slide in the first and second cam grooves 42 and 44, such that the first and second lens group 60 extend axially with respect to the guide lens barrel 50. Limited by the first and second sliding slots 52, 54 of the guide lens barrel 50, the first and second sliding pins 626d, 726c cannot rotate following the rotation of the cam lens barrel 40, and the first lens group 60 and second lens group 70 extend axially without rotation. Accordingly, the zoom lens 100 reaches its maximum focal length, and to return to the minimum focal length, needs only reverse the first driving device 92 of the driving mechanism 90. The third lens group 80 can move axially by the second driving device 94 to focus on objects and acquire images accordingly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A zoom lens comprising:
   a substrate defining a plurality of openings thereon;
   an imaging unit attached on the substrate;
   a stationary lens barrel mounted on the substrate and surrounding the imaging unit, the stationary lens barrel defining a plurality of first sliding grooves angled from the optical axis of the zoom lens and a plurality of second sliding grooves parallel to the optical axis of the zoom lens in the inner circumference thereof;
   a cam lens barrel rotatably received in the stationary lens barrel and moveable along the optical axis of the zoom lens following the rotation thereof along the inner circumference of the stationary lens barrel; and
   a guide lens barrel received in the cam lens barrel and moveable along the optical axis of the zoom lens following the motion of the cam lens barrel, the guide lens barrel comprising a plurality of key members protruding outwards from the outer circumference corresponding to and received in the openings of the substrate when the zoom lens is in the minimum focal length position, wherein the key members extend beyond the rear end of the cam lens barrel adjacent to the substrate and align with the second sliding grooves.

2. The zoom lens as claimed in claim 1, wherein the cam lens barrel comprises a plurality of cam pins projecting outwards at substantially evenly separated positions on the outer circumference of the lens barrel near the rear end thereof adjacent to the substrate; and the cam pins are respectively fitted in the first sliding grooves of the stationary lens barrel.

3. The zoom lens as claimed in claim 2, wherein each first sliding groove comprises a spiral portion angled from the optical axis of the zoom lens, and an arched portion perpendicular to the optical axis of the zoom lens and communicating with an end of the spiral portion.

4. The zoom lens as claimed in claim 3, wherein each spiral portion coils in a constantly changing path along the inner circumference of the stationary lens barrel from a rear end of the stationary lens adjacent to the substrate to a front end of the stationary lens away from the substrate.

5. The zoom lens as claimed in claim 2, wherein the cam lens barrel defines a plurality of first cam grooves and a plurality of second cam grooves thereon which are evenly spaced in the inner circumference along the circumferential direction of the cam lens barrel.

6. The zoom lens as claimed in claim 5, wherein the first cam grooves and the second cam grooves are formed by cutaways on the inner side of the cam lens barrel.

7. The zoom lens as claimed in claim 5, wherein the cam lens barrel further comprises a plurality of reinforcing blocks formed on the inner circumference adjacent to the corners of the first and second cam grooves of the cam lens barrel.

8. The zoom lens as claimed in claim 7, wherein the cam barrel comprises a plurality of sliding bars projecting inwards from the inner circumference of the cam barrel and evenly positioned in the circumferential direction for slidably engaging the guide lens barrel.

9. The zoom lens as claimed in claim 8, wherein, the guide lens barrel defines a plurality of notches on the outer circumference thereof along which the sliding bars and the reinforcing blocks slide can slide in, and a plurality of passing channels on the outer circumference thereof communicating with the notches and axially extending to a front distal end of the guide lens barrel away from the substrate, through which the blocks and sliding bars fit in the notches.

10. The zoom lens as claimed in claim 2, wherein the cam lens barrel further comprises a toothed bar formed on the outer circumference between the adjacent cam pins.

11. The zoom lens as claimed in claim 10, wherein the toothed bar and the cam pins of the cam lens barrel are formed on the same latitudinal circumference of the cam lens barrel.

12. The zoom lens as claimed in claim 5, wherein the guide lens barrel defines a plurality of first sliding slots and second sliding slots extended axially on and running through the guide lens barrel.

13. The zoom lens as claimed in claim 10, further comprising a driving mechanism configured for driving the zoom lens to carry out focus operations.

14. The zoom lens as claimed in claim 13, wherein the driving mechanism comprises a first driving device and second driving device mounted at about 90 to 180° separation on the outer circumference of the stationary lens barrel.

15. The zoom lens as claimed in claim 14, wherein the first driving device further comprises a driving gear rotatably set in the stationary lens barrel and meshed with the toothed bar of the cam lens barrel.

16. The zoom lens as claimed in claim 15, further comprising first and second lens groups slidably received in the guide lens barrel in sequence and sliding in the cam lens barrel for axial extension with the guide lens barrel following the rotation of the cam lens barrel.

17. The zoom lens as claimed in claim 16, further comprising a third lens group mounted on the substrate facing the imaging unit and aligning with an optical axis of the first and second lenses of the first and second lens groups, and drivably meshed with the second driving device.

* * * * *